No. 770,591. PATENTED SEPT. 20, 1904.
L. J. KURTZ.
FLAT IRON HEATER.
APPLICATION FILED SEPT. 22, 1903.
NO MODEL.

Witnesses: Inventor:
Lucy J. Kurtz,
By her Attorneys
Louis Bagger & Co.

No. 770,591. Patented September 20, 1904.

UNITED STATES PATENT OFFICE.

LUCY J. KURTZ, OF DAVENPORT, IOWA.

FLAT-IRON HEATER.

SPECIFICATION forming part of Letters Patent No. 770,591, dated September 20, 1904.

Application filed September 22, 1903. Serial No. 174,222. (No model.)

*To all whom it may concern:*

Be it known that I, LUCY J. KURTZ, a citizen of the United States, residing at Davenport, in the county of Scott and State of Iowa, have invented new and useful Improvements in Flat-Iron Heaters, of which the following is a specification.

My invention relates to improvements particularly in flat-iron heaters, while it is capable of being utilized for other domestic purposes—as, for instance, baking pastry or pies, &c.

Said invention is characterized for great simplicity and affords an expeditious and economical means of effecting the intended purpose as above outlined. It is also capable of being manufactured at the minimum cost and can be readily applied for use.

Said invention consists of the combination and arrangement of parts, including their construction, substantially as hereinafter more fully disclosed, and specifically pointed out by the claim concluding the following description.

Figure 1:
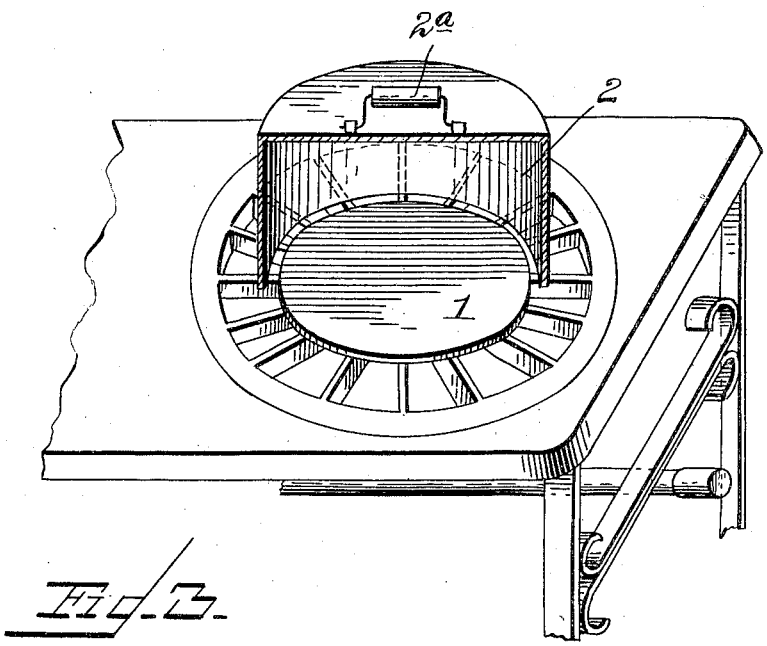
Figure 2:
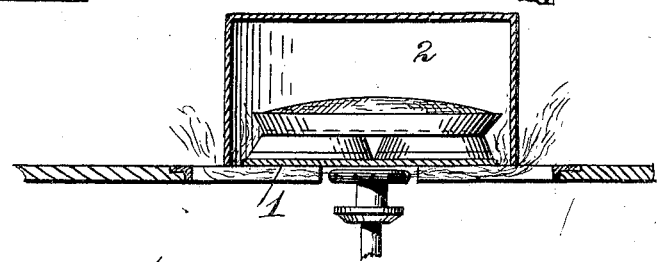
Figure 3:
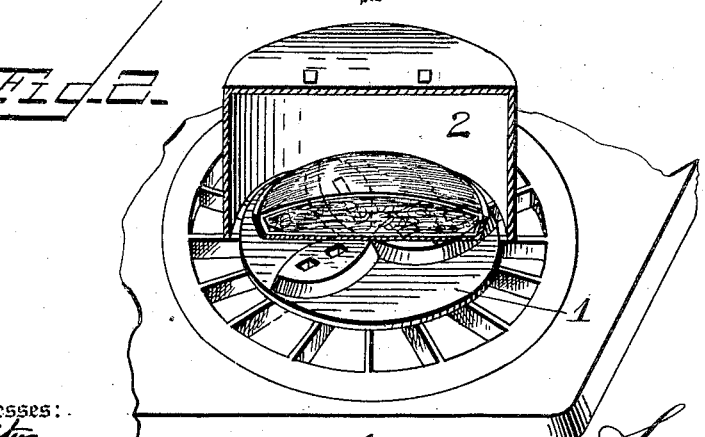

In the accompanying drawings, illustrating the preferred embodiment of my invention, Figure 1 is a view, partly in section and perspective thereof, showing the same applied to an ordinary gasolene burner or stove. Fig. 2 is a perspective view, partly in section, of the same with a flat-iron placed therein for heating and a pie-baking "tin" resting upon said flat-iron, the handle of said iron having been removed or detached. Fig. 3 is a sectional elevation.

In carrying out my invention I provide, preferably, a disk or plate 1 suitable especially for the placing thereon of a flat-iron, preferably three such irons, for heating, as presently will more fully appear. Said disk or plate rests flat upon the gasolene burner or stove or other heating medium, as shown, to expose said plate or disk to the heating action of the flame issuing from said burner. An open-bottomed cylinder or closure 2, with a suitable handle or handhold 2ª applied or connected to its top, preferably as shown, is adapted to be placed in position upon the spider portion of said gasolene-burner to inclose the disk 1 to confine the heat of the flame of said burner, and thus augment the heating capacity of the device. The side walls of said cylinder or closure stand a suitable distance from the perimeter or edge of said disk or plate to allow said heat to pass upwardly therebetween and further aid in that way the heating of the flat-irons or articles placed upon said disk or plate. It is also obvious that a tin with a pie or other pastry placed therein may be set into the cylinder and rest upon said flat-irons, the handles of the latter having been removed, said device thus serving as a heater and for baking purposes simultaneously, greatly economizing in fuel, and consequently expense, as well as in time and labor, which would otherwise be involved. It is also noted that by means of this device the flat-irons (a number being placed therein) may be maintained in a heated state to provide for their continuous use, while the closure or cylinder may be covered with asbestos to prevent the radiation of the heat.

I do not wish to be limited as to details of construction, as these may be modified in many particulars without departing from the spirit of my invention.

Having thus described my invention, what I claim as new, and desire to secure by Letters Patent, is—

A heater of the character described, consisting of a burner-grid, a flat disk or plate adapted to rest thereon, and an open-bottomed closure adapted to be placed over said plate or disk, said plate or disk and closure being arranged with relation to said burner-grid to cause the heat to enter said closure and also envelop the same, and said closure being of less diameter than said burner-grid but of greater diameter than said plate or disk.

In testimony whereof I have hereunto set my hand in presence of two subscribing witnesses.

LUCY J. KURTZ.

Witnesses:
LOUIS BLOCK,
W. A. WATTS.